US007966320B2

(12) United States Patent
Roshen

(10) Patent No.: US 7,966,320 B2
(45) Date of Patent: *Jun. 21, 2011

(54) SYSTEM AND METHOD FOR IMPROVING NON-EXACT MATCHING SEARCH IN SERVICE REGISTRY SYSTEM WITH CUSTOM DICTIONARY

(75) Inventor: Waseem Ahmed Roshen, Hilliard, OH (US)

(73) Assignee: International Business Machines Corporation, Armonk, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/175,552

(22) Filed: Jul. 18, 2008

(65) Prior Publication Data

US 2010/0017405 A1   Jan. 21, 2010

(51) Int. Cl.
G06F 7/00 (2006.01)
(52) U.S. Cl. ........................................................ 707/723
(58) Field of Classification Search .................. 707/752, 707/723
See application file for complete search history.

(56) References Cited

U.S. PATENT DOCUMENTS

| 5,274,806 | A | 12/1993 | Hill |
| 6,519,585 | B1 * | 2/2003 | Kohli ................................. 1/1 |
| 6,961,937 | B2 | 11/2005 | Avvari et al. |
| 7,124,062 | B2 | 10/2006 | Gebhart |
| 7,321,919 | B2 | 1/2008 | Jacobs et al. |
| 7,634,462 | B2 | 12/2009 | Weyand et al. |
| 7,676,460 | B2 | 3/2010 | Morgan |
| 7,676,462 | B2 | 3/2010 | Kirkland et al. |
| 7,676,472 | B2 | 3/2010 | Kurhekar et al. |
| 7,693,829 | B1 | 4/2010 | Alshawi |
| 2004/0064554 | A1 | 4/2004 | Kuno et al. |
| 2004/0186831 | A1 | 9/2004 | Hiratsuka et al. |
| 2005/0065920 | A1 | 3/2005 | He et al. |
| 2005/0114306 | A1 | 5/2005 | Shu et al. |
| 2006/0265508 | A1 | 11/2006 | Angel et al. |
| 2007/0033167 | A1 | 2/2007 | Basu et al. |
| 2007/0162421 | A1 | 7/2007 | Pang et al. |
| 2007/0263534 | A1 | 11/2007 | Pavlick |

(Continued)

FOREIGN PATENT DOCUMENTS

EP    1855218 A2    11/2007

(Continued)

OTHER PUBLICATIONS

Papazoglou et al., "Service Oriented Architectures: Approaches, Technologies and Research Issues," VLDB Journal, Springer Berlin / Heidelberg, vol. 6, No. 3, Jul. 2007, pp. 389-415(27).

(Continued)

Primary Examiner — Pierre M Vital
Assistant Examiner — Truong V Vo
(74) Attorney, Agent, or Firm — Schmeiser, Olsen & Watts; John R. Pivnichny

(57) ABSTRACT

A system and associated method for searching a service registry system with a service name. The service registry system receives a request to search a service description with the service name. The service registry system first searches a registry for a service identifier that matches the service name in the request, and if there is no matching service identifier, the service registry system composes at least one candidate service name from synonyms of respective component words that are comprised by the service name. The service registry system performs another search in the registry with said composed candidate service name for all composed candidate service names and service descriptions associated with any match are returned.

16 Claims, 5 Drawing Sheets

U.S. PATENT DOCUMENTS

| | | | |
|---|---|---|---|
| 2008/0059486 A1* | 3/2008 | Pappas | 707/100 |
| 2008/0069124 A1 | 3/2008 | Patrick | |
| 2008/0086370 A1 | 4/2008 | Narayanaswami et al. | |
| 2008/0091670 A1 | 4/2008 | Ismalon | |
| 2008/0120380 A1 | 5/2008 | Boyd et al. | |
| 2008/0133508 A1 | 6/2008 | Jiang et al. | |
| 2008/0208835 A1 | 8/2008 | Sauls et al. | |
| 2008/0306751 A1 | 12/2008 | Conroy et al. | |
| 2009/0018998 A1 | 1/2009 | Patten, Jr. et al. | |
| 2009/0049040 A1 | 2/2009 | Fay et al. | |
| 2009/0063522 A1 | 3/2009 | Fay et al. | |
| 2009/0070456 A1 | 3/2009 | Brown et al. | |
| 2009/0089078 A1 | 4/2009 | Bursey | |
| 2009/0089277 A1 | 4/2009 | Cheslow | |
| 2009/0125332 A1 | 5/2009 | Martin | |
| 2009/0132698 A1 | 5/2009 | Barnhill, Jr. | |
| 2009/0144262 A1 | 6/2009 | White et al. | |
| 2009/0144266 A1 | 6/2009 | Bicioglu | |
| 2009/0193096 A1 | 7/2009 | Boyer et al. | |
| 2009/0210408 A1 | 8/2009 | Boyer et al. | |
| 2009/0222429 A1 | 9/2009 | Aizenbud-Reshef et al. | |
| 2009/0235167 A1 | 9/2009 | Boyer et al. | |
| 2010/0017387 A1 | 1/2010 | Roshen | |
| 2010/0036838 A1 | 2/2010 | Ellis | |
| 2010/0042590 A1 | 2/2010 | Smyros et al. | |

FOREIGN PATENT DOCUMENTS

| | | |
|---|---|---|
| WO | 2006110684 | 10/2006 |
| WO | 2006113092 A2 | 10/2006 |
| WO | 2008078366 A1 | 7/2008 |

OTHER PUBLICATIONS

Soto-Carrion et al., "General Ontology Service Engine (GORSE): a new approach to integrate the semantic web knowledge on service oriented architectures," pp. 1-22 retrieved Nov. 2009. http://www.imai-software.com/openlab/data/GROSE_DRAFTv0_1.pdf.

"osESB Documentation, Part 1: The SOA Stack and the ESB," Nov. 5, 2007, pp. 1-22. http://www.osesb.org/documentation/The%20SOA%20Stack%20and%20the%20ESB.pdf.

Pohlsen et al., "A Concept for a Medical Device Plug-and-Play Architecture based on Web Services," pp. 1-7, retrieved Oct. 20, 2009. http://sigbed.seas.upenn.edu/archives/2009-07/SchlichtingSIGBED.pdf.

Office Action (Mail Date Oct. 27, 2010) for U.S. Appl. No. 12/174,944, filed Jul. 17, 2008; Confirmation No. 9687.

U.S. Appl. No. 12/945,151, filed Nov. 12, 2010; Confirmation No. 7151.

U.S. Appl. No. 12/945,337, filed Nov. 12, 2010; Confirmation No. 7540.

Lausen et al.; Survey of Current Means to Discover Web Services; Semantic Technology Institute (STI) Aug. 2008; 15 pages.

Ahmadi et al.; Flexible Matching and Ranking of Web Service Advertisements; Nov. 2007; 22 pages.

Mokhtar et al.; Interoperable Semantic & Tyntactic Service Matching for Ambient Computing Environments; Aug. 2008; 11 pages.

Bai et al.; Resource Matching and a Matchmaking Service for an Intelligent Grid; International Conference on Computational Intelligence 2004; 4 pages.

Corrales et al.; BeMatch: A Platform for Matchmaking Service Behavior Models; Mar. 2008; 5 pages.

Medjahed et al.; Composing Web Services on the Semantic Web; The VLDB Journal (2003); pp. 333-351.

Nawaz et al.; SEMREG-PRO: A Semantic based Registry for Proactive Web Service Discovery using Publish-Subscribe Model; Fourth International Conference on Semantics, Knowledge and Grid, IEEE 2008; pp. 301-308.

U.S. Appl. No. 13/039,368, Filing Date Mar. 3, 2011; First Named Inventor: Waseem A. Roshen.

Roshen, Waseem, Ph. D., "Service Registry with Advanced Search Capability, Part 1: Concepts, Process and Components", Internet Article Dated Nov. 6, 2009, pp. 1-9. [retrieved from http://public.dhe.ibm.com/software/dw/webservices/ws-SOAregadvsearch/ws-SOAregadvsearch-pdf.pdf on Jan. 11, 2011].

Balani, Naveen, "Model and Build ESB SOA Frameworks", Internet Article Dated Mar. 15, 2005, pp. 1-4. [retrieved from http://www.ibm.com/developerworks/web/library/wa-soaesb/ on Jan. 12, 2011].

International Search Report for PCT/EP2010/066559, Dated Jan. 27, 2011. 5 pages.

U.S. Appl. No. 12/625,250—Filing Date Nov. 24, 2009.

Notice of Allowance (Mail Date Mar. 22, 2011) for U.S. Appl. No. 12/174,944—Filing Date Jul. 17, 2008.

\* cited by examiner

METHOD IMPLEMENTING DICTIONARY IN STEP 240 OF FIG. 2
WITH CUSTOM DICTIONARY FILE

METHOD FOR EXECUTING STEP 240 OF FIG. 2

SYSTEM AND METHOD FOR IMPROVING NON-EXACT MATCHING SEARCH IN SERVICE REGISTRY SYSTEM WITH CUSTOM DICTIONARY

FIELD OF THE INVENTION

The present invention discloses a system and associated method for improving search functionalities of a service registry system to decouple the service registry system from a software application that employs services defined in the service registry system.

BACKGROUND OF THE INVENTION

Conventional software application development environments, often referred to as an integrated development environment (IDE), do not provide sufficient supports for a specific type of end products that is being development with the IDE. When an end product is a Service-Oriented Architecture (SOA) business application, it is desirable for the IDE to support a parallel development of both client modules and service modules of the SOA business application to shorten a development time, and to support loose couplings of tasks requested by clients and services provided by the service modules to make the SOA business application more portable and flexible for other business needs and platforms. Conventional software application development environments do not have features either supporting such parallel development of client and service modules or loosely coupling client and service modules within a same software application project.

Thus, there is a need for a system and associated method that overcomes at least one of the preceding disadvantages of current methods and systems for a software application development environment.

SUMMARY OF THE INVENTION

The present invention provides a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary map of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system in which the service registry system operates.

The present invention provides a computer program product, comprising a computer usable medium having a computer readable program code embodied therein, said computer readable program code containing instructions that when executed by a processor of a computer system implement a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary map of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system in which the service registry system operates.

The present invention provides a computer system comprising a processor and a computer readable memory unit coupled to the processor, said memory unit containing instructions that when executed by the processor implement a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary map of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system in which the service registry system operates.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for searching a service registry system with a service name, the method comprising:

receiving a request to locate, in a registry of the service registry system, a service description that corresponds to the service name specified in the request, wherein the registry comprises at least one service description searchable by a respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary map of the service registry system;

subsequent to said producing, generating at least one candidate service name with said respective synonym list for each component word;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system in which the service registry system operates.

The present invention provides a method and system that overcomes at least one of the current disadvantages of conventional method and system for searching a web service registry during development of a client application employing service definitions in the web service registry.

DETAILED DESCRIPTION OF THE INVENTION

Figure 1:
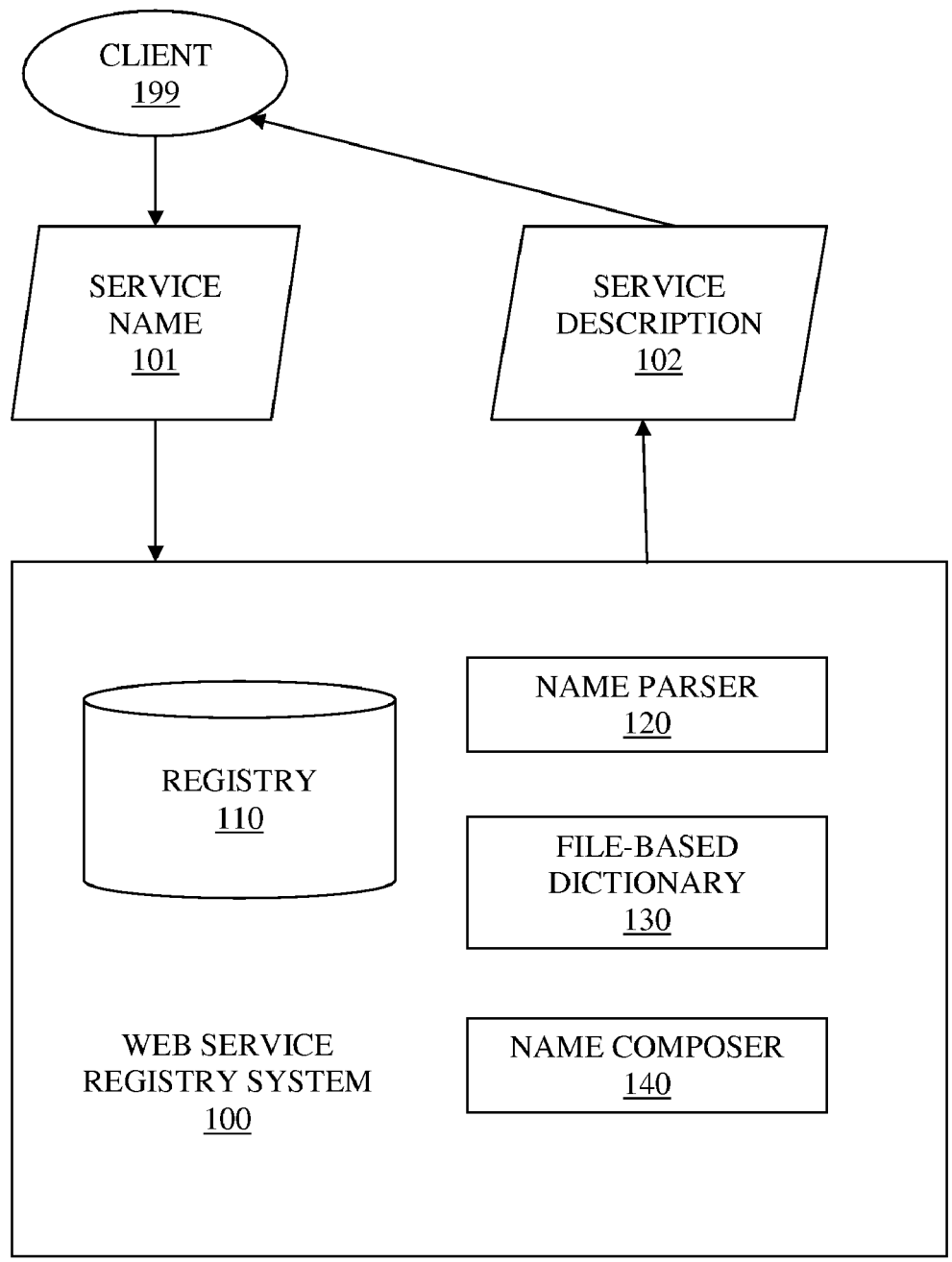
FIG. 1 illustrates a system looking up a web service registry system for a service name, in accordance with embodiments of the present invention.

FIG. 1 illustrates a system looking up a web service registry system 100 for a service name 101, in accordance with embodiments of the present invention.

A web service is defined as a software system designed to support interoperation and/or interactions between machines over a network. The web service has an interface described in a format that can be processed by a computer processor. Examples of such format may be, inter alia, Web Services Description Language (WSDL) in implementing the Universal Description, Discovery, and Integration (UDDI) interface, etc. The web service is provided in a business process model called a Service-Oriented Architecture (SOA). The Service-Oriented Architecture (SOA) is defined as a business-driven software system that supports integration and linkage of business tasks or web services. The Service-Oriented Architecture (SOA) supports customers by making the software system easily and cost-effectively adaptable to changing business needs of customers. To keep the flexibility of the Service-Oriented Architecture (SOA), each individual business process desired by customers should be loosely coupled to relevant business tasks or services that are implemented by the software system. Also, because of rapidly changing business needs, software modules of the Service-Oriented Architecture (SOA) are often developed concurrently. Consequently, client modules should be developed during service definition is not known in a complete form.

In this specification, the term web service and the term service are used interchangeably. A web service registry system 100 supports a parallel development of client modules and service modules of a Service-Oriented Architecture (SOA) software system, by providing loose coupling of service definitions provided in the software project and corresponding service descriptions that associates tasks that should be performed according to the service definition. The SOA software system comprises at least one web service. Each web service provided by the SOA software system is identified by a service name 101, and a service description 102 corresponding to the service name 101 is registered in the web service registry system 100.

The web service registry system 100 is a software component in the Service-Oriented Architecture (SOA) software system used to publish, discover and manage said at least one web services. The web service registry system 100 is a central reference point in storing and managing metadata for said at least one web services within the Service-Oriented Architecture (SOA) of the SOA software system. Information described in metadata for a web service may be, inter alia, what the service is, how the service is used, and how the service is interconnected with other components, etc. The metadata for web services fosters reuse of services assets and to govern services throughout the lifecycle of the Service-Oriented Architecture of the SOA software system. Examples of the web service registry system 100 may be, inter alia, WebSphere® Service Registry and Repository (WSRR) by IBM®, etc. (WebSphere and IBM are trademarks of the International Business Machines, Inc., registered in the United States and other countries.) In this specification, the service description 102 refers to the metadata published and stored in the web service registry system 100 that corresponds to a respective service identified by the service name 101.

In conventional web service registry system, to discover a service description during development of a software system, a programmer of the software system needs to know a service name identifying the service description. Although there is a find_service operation to find a service in the Universal Description, Discovery, and Integration (UDDI) interface of the conventional web service registry system, the find_service operation is impractically difficult to use for the programmer while developing the software system.

The method of the present invention enables discovery of a service description 102 in the web service registry system 100 with a service name 101 that is not identical to a service name of the service description as stored in the web service registry system 100. By supporting discovery of the service description 102 without exactly matching service name, the method of the present invention makes the SOA software system loosely coupled or decoupled, and consequently more flexible and portable, and easier to concurrently develop client modules without fully-developed service modules. Without the method of the present invention, a client 199 of the SOA software system must know an exact service name to utilize corresponding service definition in developing client modules. Ordinarily, the client of the SOA software system is a programmer developing client modules utilizing service descriptions of the SOA software system. To know an exact service name, the client 199 must directly or indirectly communicate with web service developers to find a web service through a conventional method of the UDDI registry. The method of the present invention resolves the needs for communication between the client 199 and the web service developers, and consequently decouples service modules providing the web services and client modules and/or tasks utilizing the web services.

The method of the present invention enables the client 199 to integrate service descriptions into client modules being developed even when service modules are not completed and service names are not known to the client 199. Thus, the method of the present invention supports reducing the amount of time required for developing the SOA software system by permitting concurrent development of client modules and service modules instead of developing client modules after service modules.

The method of the present invention also makes the SOA software system more portable by overcoming naming convention peculiar to a certain service provider. Because the web service registry system 100 of the present invention can match the service name 101 to the service description 102 that is identified by a name that has similar meaning and interchangeable usage but not identical to the service name, there is no need to develop multiple client modules of the SOA software system with same functionality only to coordinate naming conventions between service modules and client modules. For example, provided that one car dealership uses "getCarPrice" and another car dealership uses "getAutomobilePrice" in respective client application to retrieve price of their respective brand of car, the method of the present invention eliminates a need to develop a separate client application for each car dealership, as opposed to being required by conventional SOA software systems using UDDI registries.

The web service registry system 100 comprises a registry 110, a name parser 120, a file-based dictionary 130, and a name composer 140. The web service registry system 100 receives the service name 101 as an input from the client 199 to perform a search for the service description 102 corresponding to the service name 101. After performing the search, the web service registry system 100 returns the service description 102 to the client 199 as a result.

The registry 110 searches a data repository of the registry 110 for the service description 102 corresponding to the service name 101 as provided by a client 199 or a candidate service name as composed by the name composer 140.

The name parser 120 receives the service name 101 from the registry 110 and parses the received service name 101. The name parser 120 produces a component word list comprising all words appearing in the service name 101. In one embodiment of the present invention, upon receiving the service name 101 "getCarPrice", the name parser 120 produces a component word list {"get", "car", "price"}.

The file-based dictionary 130 receives the component word list from the name parser 120 and produces a synonym list for each word in the component word list produced by the name parser 120. In the same embodiment, the file-based dictionary 130 produces a synonym list {"get", "fetch", "obtain"} for a component word "get" of the component word list above. See FIGS. 3A and 3B, infra, for details.

The name composer 140 receives all synonym lists and produces a candidate service name list by ordering and concatenating synonyms in synonym lists. In one embodiment of the present invention, the name composer 140 produces a candidate service name list {"getCarPrice", "getVehiclePrice", "getAutomobilePrice", "obtainCarPrice", "obtainVehiclePrice", "obtainAutomobilePrice", "fetchCarPrice", "fetchVehiclePrice", "fetchAutomobilePrice"} with three synonym lists {"get", "fetch", "obtain"}, {"car", "vehicle", "automobile"}, and {"price"}.

Figure 2:
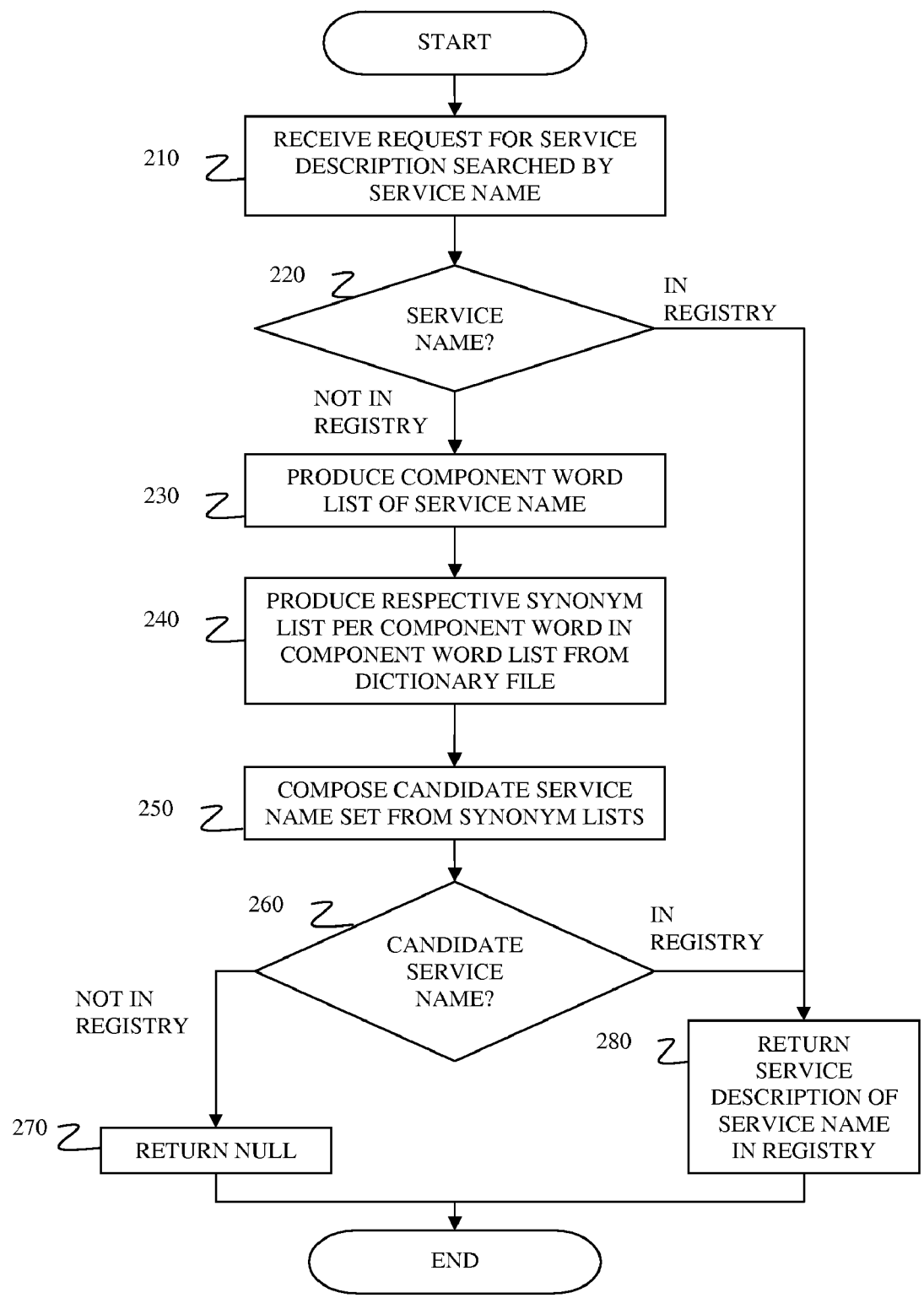
FIG. 2 is a flowchart depicting a method for searching a web service registry, in accordance with the embodiments of the present invention.

FIG. 2 is a flowchart depicting a method for searching a web service registry, in accordance with the embodiments of the present invention. The method of the present invention is performed by a web service search process which comprises a single process or multiple modules separated per functionality, as shown in FIG. 1, supra.

In step 210, the web service search process receives a request for a service description with a service name as a search key for the service description.

In step 220, the web service search process determines whether the received service name is registered in a registry of a web service registry system. If the web service search process determines that the service name is registered in the registry, the web service search process proceeds with step 280. If the web service search process determines that the service name is not registered in the registry, the web service search process proceeds with step 230. In another embodiment, steps 210 and 220 are performed by a separate module dedicated for searching the registry.

In step 230, the web service search process parses the received service name and produces a component word list comprising all words appearing in the received service name. In another embodiment of the present invention, step 230 is performed by a separate module dedicated for parsing name.

In step 240, the web service search process produces a respective synonym list for each word in the component word list from step 230. In another embodiment of the present invention, step 240 is performed by a separate module dedicated for locating synonyms in a dictionary map derived from a dictionary file.

In step 250, the web service search process produces a candidate service name list. In one embodiment of the present invention, each candidate service name in the candidate service name list is composed as a concatenated string of words from each synonym list in an order of appearance as in the service name. In another embodiment of the present invention, step 250 is performed by a separate module dedicated for composing candidate service names from the synonym lists.

In step 260, the web service search process determines whether the composed candidate service name is registered in the registry of the web service registry system. If the web service search process determines that the candidate service name is registered in the registry, the web service search process proceeds with step 280. If the web service search process determines that the service name is not registered in the registry, the web service search process proceeds with step 270. In another embodiment, steps 210, 220, and 260 are performed by a separate module dedicated for searching the registry.

In step 270, the web service search process returns null to the client, because neither the service name provided in the search request nor the candidate service name composed by the web service search process is registered in the registry of the web service registry system, and consequently there is no web service description properly matching the service name in the search request.

In step 280, the web service search process returns the service description that matches to either the service name in the search request or candidate service names composed by the web service search process. If there is more than one service description found from searching candidate service names, the web service search process returns all matching service descriptions. Subsequent to performing step 270 or step 280, the web service search process terminates processing the service request and waits for another service request.

Figure 3A:
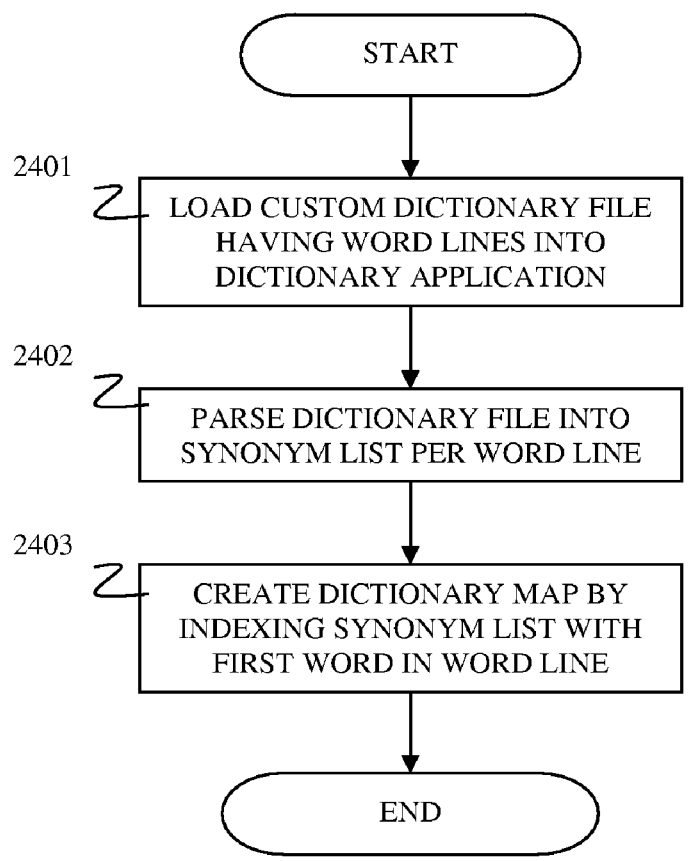
FIG. 3A is a flowchart depicting a method for implementing a customized dictionary file of the web service registry system of FIG. 1, in accordance with the embodiments of the present invention.

FIG. 3A is a flowchart depicting a method for implementing a customized dictionary file of the web service registry system of FIG. 1, supra, in accordance with the embodiments of the present invention.

In this embodiment, the dictionary is implemented as a separate module in the web service registry system. The dictionary comprises a dictionary process and a dictionary file. The dictionary process communicates with other processes in the web service registry system through sockets or socket-based messaging software. An example of messaging software products may be, inter alia, WebSphere® MQ by IBM®. In another embodiment, the dictionary functionality may be provided as a web service.

In step 2401, the dictionary process loads the dictionary file into the dictionary process. The dictionary file is created to have at least one line comprising a key word followed by zero or more synonym for the key word. Each word, either the key word or a synonym, is separated from another by a predefined delimiter. The dictionary file is stored in a storage device of a computer system on which the service registry system runs.

In step 2402, the dictionary process parses each line of the dictionary file into a respective synonym list comprising at least one synonym.

In step 2403, the dictionary process creates a dictionary map by indexing all synonym lists parsed in step 2402 with a first word in each word line to make the synonym lists searchable by the first word.

Figure 3B:
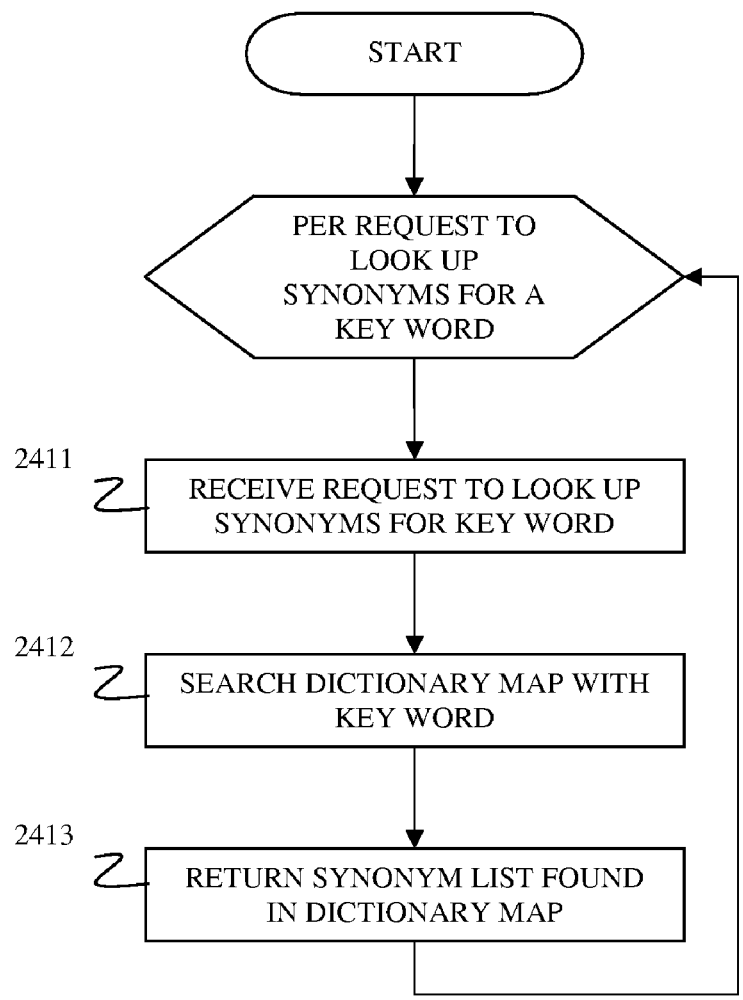
FIG. 3B is a flowchart depicting a method for producing a respective synonym list using the customized dictionary file for each component word of the service name, in accordance with the embodiments of the present invention.

FIG. 3B is a flowchart depicting a method for producing a respective synonym list using the customized dictionary file for each component word of the service name, in accordance with the embodiments of the present invention. The dictionary process performs steps 2411, 2412, and 2413 for each request to produce a synonym list for a word.

In step 2411, the dictionary process receives a request to look up synonyms for a key word.

In step 2412, the dictionary process searches the dictionary map with the key word.

In step 2413, the dictionary process returns a synonym list corresponding to the key word found in the dictionary map. If no match for the key word is found, the dictionary process returns null.

The file-based dictionary embodiment yields high performance search functionality comparing to a database-based dictionary, because entire dictionary is in the computer memory. The file-based dictionary embodiment is more easily integrated with the web service registry system than dictionaries implemented with a relational database because an application program utilizing the file-based dictionary is customized without being limited to queries and tools specific to a database employed for a database-based dictionary.

To further the performance of search functionalities, the dictionary may have sub-categories according to content of the dictionary. Examples of sub-categories of the dictionary may be, inter alia, a dictionary of organization-specific terms, a dictionary of industry specific terms, a dictionary of general terms, etc. Because the number of terms to look up is limited as the dictionary contains only a small number of relevant terms in searching a service name, a search request for the service name in the web service registry system is performed more efficiently.

Also, the file-based dictionary is more easily expandable as necessary, as opposed to a database-based dictionary of which schema is fixed at the time of designing the database-based dictionary. The file-based dictionary is expandable in terms of not only the number of words that are listed in the dictionary but also length of an individual word that is listed in the dictionary. Consequently, synonyms in the file-based dictionary are not limited in length, and any user-defined term of various lengths can be listed in the dictionary.

Figure 4:
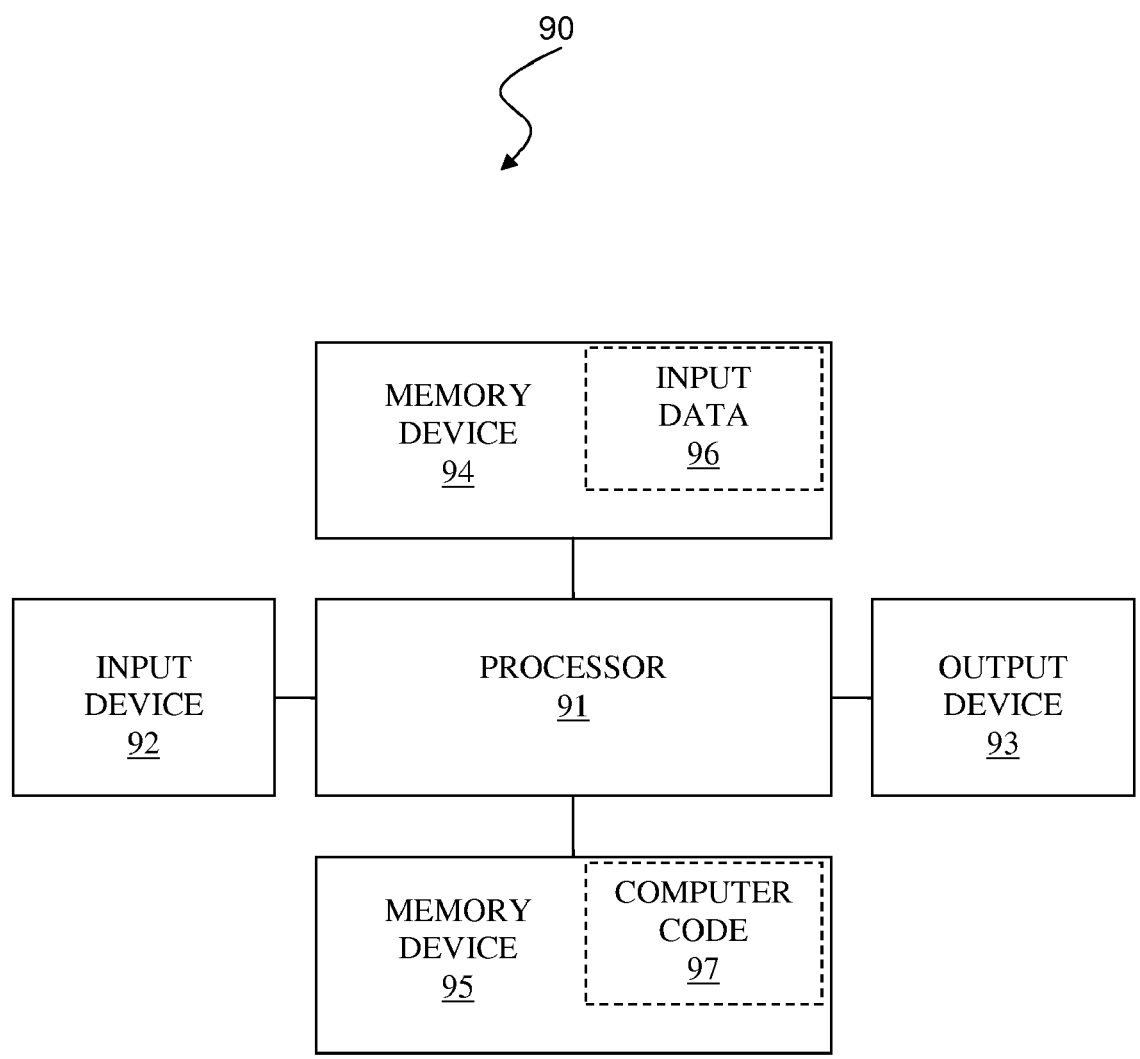
FIG. 4 illustrates a computer system used for looking up a web service registry system for a service name, in accordance with embodiments of the present invention.

FIG. 4 illustrates a computer system 90 used for looking up a web service registry system for a service name, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for looking up a web service registry system for a service name, according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for looking up a web service registry system for a service name.

In another embodiment, the invention provides a business method that performs the process steps of the invention on a subscription, advertising and/or fee basis. That is, a service provider, such as a Solution Integrator, can offer to create, maintain, support, etc. a process for extensible data interface for the shared service module of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for searching a service registry system with a service name, the method comprising:
   receiving a request to locate, in a registry of the service registry system, a service description that corresponds to the service name specified in the request, wherein the registry comprises at least one service description searchable by a respective service identifier, wherein the service registry system is a software component in the Service Oriented Architecture (SOA) software system that is used to publish, discover and manage at least one web service identified by the respective service identifier that is provided by the SOA software system, and wherein said at least one service description represents respective metadata published and stored in the web service registry system that corresponds to the respective service identifier;
   subsequent to said receiving, determining that the service name specified in the request does not match any service identifier discovered in the registry;
   subsequent to said determining, parsing the service name into at least one component word;
   subsequent to said parsing, producing a respective synonym list for each component word of said at least one component word from a dictionary map of the service registry system, wherein the dictionary map comprises at least one word line, wherein each word line of said at least one word line comprises a respective index word and zero or more synonym of the respective index word, wherein said producing comprising:
      selecting a first component word of said at least one component word;
      discovering an index word of the dictionary map of the service registry system that matches the selected first component word; and
      storing a word line of the dictionary map that begins with the discovered index word to a first synonym list;
   subsequent to said producing, generating at least one candidate service name with said respective synonym list for each component word by concatenating a respective word selected from the respective synonym list for said each component word, in an order of appearance as in the service name specified in the request;
   subsequent to said generating, concluding that a first candidate service name of said at least one candidate service name is located in the registry by finding a first service identifier in the registry that is identical to the first candidate service name; and
   subsequent to said concluding, sending a first service description that corresponds to the first service identifier in the registry to an output device of a computer system in which the service registry system operates.

2. The method of claim 1, said generating comprising:
   replacing a first component word of said at least one component word with a first synonym from the first synonym list, wherein the first synonym list comprises zero or more synonym of the first component word;
   subsequent to said replacing, storing a result from said replacing to a first candidate service name such that the first candidate service name synonymous to the service name is compared with service identifiers in searching the registry for the service description corresponding to the service name.

3. The method of claim 2, the method further comprising:
   iterating said replacing and said storing for each synonym in the first synonym list of the first component word; and
   upon completing said iterating, repeating said iterating for another synonym list of another component word of the service name for each component word of said at least one component word from said parsing.

4. The method of claim 1, the method further comprising:
   repeating said concluding and said sending for each candidate service name of said at least one candidate service name from said generating.

5. A computer program product, comprising a computer usable storage medium having a computer readable program code embodied therein, said computer readable program code containing instructions that when executed by a processor of a computer system implement a method for searching a service registry system with a service name, the method comprising:
   receiving a request to locate, in a registry of the service registry system, a service description that corresponds to the service name specified in the request, wherein the registry comprises at least one service description searchable by a respective service identifier, wherein the service registry system is a software component in the Service Oriented Architecture (SOA) software system that is used to publish, discover and manage at least one web service identified by the respective service identifier that is provided by the SOA software system, and wherein said at least one service description represents respective metadata published and stored in the web service registry system that corresponds to the respective service identifier;
   subsequent to said receiving, determining that the service name specified in the request does not match any service identifier discovered in the registry;
   subsequent to said determining, parsing the service name into at least one component word;
   subsequent to said parsing, producing a respective synonym list for each component word of said at least one component word from a dictionary map of the service registry system, wherein the dictionary map comprises at least one word line, wherein each word line of said at least one word line comprises a respective index word and zero or more synonym of the respective index word, wherein said producing comprising:
      selecting a first component word of said at least one component word;

discovering an index word of the dictionary map of the service registry system that matches the selected first component word; and storing a word line of the dictionary map that begins with the discovered index word to a first synonym list;

subsequent to said producing, generating at least one candidate service name with said respective synonym list for each component word by concatenating a respective word selected from the respective synonym list for said each component word, in an order of appearance as in the service name specified in the request;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system in which the service registry system operates.

6. The computer program product of claim 5, said generating comprising:

replacing a first component word of said at least one component word with a first synonym from the first synonym list, wherein the first synonym list comprises zero or more synonym of the first component word;

subsequent to said replacing, storing a result from said replacing to a first candidate service name such that the first candidate service name synonymous to the service name is compared with service identifiers in searching the registry for the service description corresponding to the service name.

7. The computer program product of claim 6, the method further comprising:

iterating said replacing and said storing for each synonym in the first synonym list of the first component word; and upon completing said iterating, repeating said iterating for another synonym list of another component word of the service name for each component word of said at least one component word from said parsing.

8. The computer program product of claim 5, the method further comprising:

repeating said concluding and said sending for each candidate service name of said at least one candidate service name from said generating.

9. A computer system comprising a processor and a computer readable memory unit coupled to the processor, said memory unit containing instructions that when executed by the processor implement a method for searching a service registry system with a service name, the method comprising:

receiving a request to locate, in a registry of the service registry system, a service description that corresponds to the service name specified in the request, wherein the registry comprises at least one service description searchable by a respective service identifier, wherein the service registry system is a software component in the Service Oriented Architecture (SOA) software system that is used to publish, discover and manage at least one web service identified by the respective service identifier that is provided by the SOA software system, and wherein said at least one service description represents respective metadata published and stored in the web service registry system that corresponds to the respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary map of the service registry system, wherein the dictionary map comprises at least one word line, wherein each word line of said at least one word line comprises a respective index word and zero or more synonym of the respective index word, wherein said producing comprising:

selecting a first component word of said at least one component word;

discovering an index word of the dictionary map of the service registry system that matches the selected first component word; and storing a word line of the dictionary map that begins with the discovered index word to a first synonym list;

subsequent to said producing, generating at least one candidate service name with said respective synonym list for each component word by concatenating a respective word selected from the respective synonym list for said each component word, in an order of appearance as in the service name specified in the request;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system in which the service registry system operates.

10. The computer system of claim 9, said generating comprising:

replacing a first component word of said at least one component word with a first synonym from the first synonym list, wherein the first synonym list comprises zero or more synonym of the first component word;

subsequent to said replacing, storing a result from said replacing to a first candidate service name such that the first candidate service name synonymous to the service name is compared with service identifiers in searching the registry for the service description corresponding to the service name.

11. The computer system of claim 10, the method further comprising:

iterating said replacing and said storing for each synonym in the first synonym list of the first component word; and upon completing said iterating, repeating said iterating for another synonym list of another component word of the service name for each component word of said at least one component word from said parsing.

12. The computer system of claim 9, the method further comprising:

repeating said concluding and said sending for each candidate service name of said at least one candidate service name from said generating.

13. A process for supporting computer infrastructure, said process comprising automatically executable process software providing at least one support service for at least one of creating, integrating, hosting, maintaining, and deploying a computer-readable code in a computing system, wherein the computer-readable code in combination with the computing system performs a method for searching a service registry system with a service name, the method comprising:

receiving a request to locate, in a registry of the service registry system, a service description that corresponds to the service name specified in the request, wherein the registry comprises at least one service description searchable by a respective service identifier, wherein the service registry system is a software component in the Service Oriented Architecture (SOA) software system that is used to publish, discover and manage at least one web service identified by the respective service identifier that is provided by the SOA software system, and wherein said at least one service description represents respective metadata published and stored in the web service registry system that corresponds to the respective service identifier;

subsequent to said receiving, determining that the service name specified in the request does not match any service identifier discovered in the registry;

subsequent to said determining, parsing the service name into at least one component word;

subsequent to said parsing, producing a respective synonym list for each component word of said at least one component word from a dictionary map of the service registry system, wherein the dictionary map comprises at least one word line, wherein each word line of said at least one word line comprises a respective index word and zero or more synonym of the respective index word, wherein said producing comprising:

selecting a first component word of said at least one component word;

discovering an index word of the dictionary map of the service registry system that matches the selected first component word; and storing a word line of the dictionary map that begins with the discovered index word to a first synonym list;

subsequent to said producing, generating at least one candidate service name with said respective synonym list for each component word by concatenating a respective word selected from the respective synonym list for said each component word, in an order of appearance as in the service name specified in the request;

subsequent to said generating, concluding that a first candidate service name of said at least one candidate service name is located in the registry by finding a first service identifier in the registry that is identical to the first candidate service name; and subsequent to said concluding, sending a first service description that corresponds to the first service identifier in the registry to an output device of a computer system in which the service registry system operates.

14. The process of claim 13, said generating comprising:

replacing a first component word of said at least one component word with a first synonym from the first synonym list, wherein the first synonym list comprises zero or more synonym of the first component word;

subsequent to said replacing, storing a result from said replacing to a first candidate service name such that the first candidate service name synonymous to the service name is compared with service identifiers in searching the registry for the service description corresponding to the service name.

15. The process of claim 14, the method further comprising:

iterating said replacing and said storing for each synonym in the first synonym list of the first component word; and upon completing said iterating, repeating said iterating for another synonym list of another component word of the service name for each component word of said at least one component word from said parsing.

16. The process of claim 13, the method further comprising:

repeating said concluding and said sending for each candidate service name of said at least one candidate service name from said generating.

* * * * *